United States Patent Office 3,330,302
Patented July 11, 1967

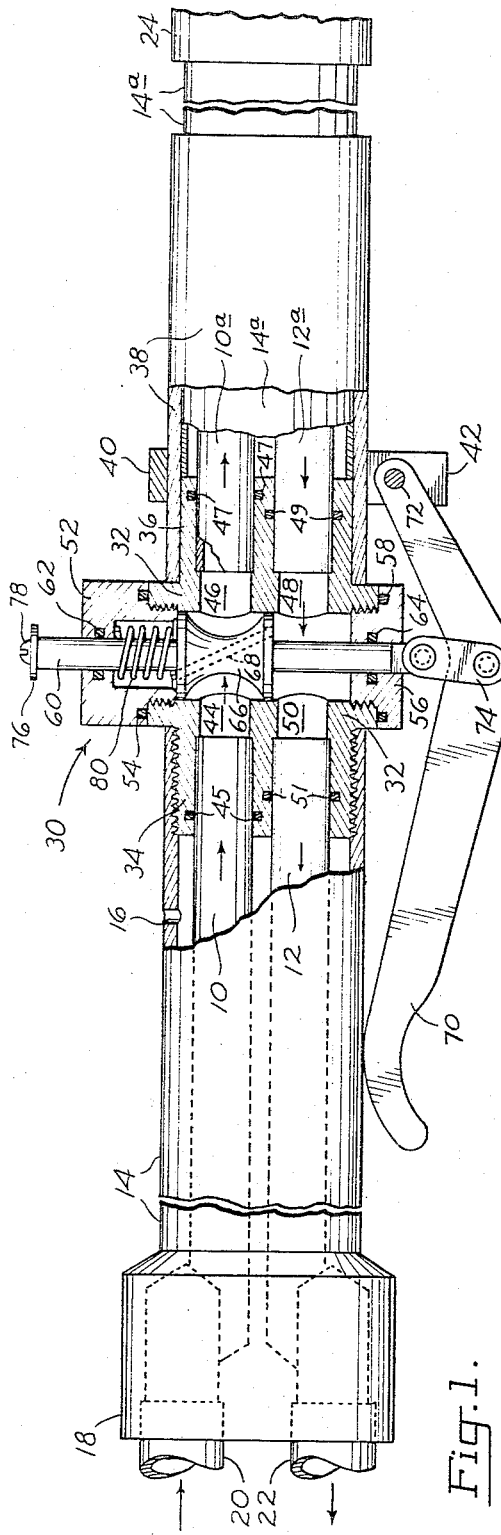

3,330,302
VALVED HYDRAULIC FLUID CONDUIT
ASSEMBLY
Edward L. Ackley, Portland, Oreg., assignor of one-half to Clifford L. Ackley, Portland, Oreg.
Filed Feb. 26, 1965, Ser. No. 435,469
7 Claims. (Cl. 137—625.29)

This invention relates to a valved hydraulic fluid conduit assembly and to a novel hydraulic valve for use therein.

In the operation of high speed rotary hydraulic motors such as those employed in driving rotary saws turning at 15,000 r.p.m. and even higher, a problem is presented in supplying pressurized hydraulic fluid to the motor under conditions which enable precise control of the motor speed without developing excessive heat and without introducing the hazard of rupturing fluid transmission lines during operation of the motor.

It is the general object of the present invention to provide a valved hydraulic fluid conduit assembly, and a novel valve for use therein, which overcomes these problems and makes possible driving rotary hydraulic motors at extremely high speeds and under precise control, but without developing excessive heat and with but little hazard of rupturing the hydraulic fluid transmission lines.

Basically considered, the presently described invention achieving the foregoing objectives comprises the combination of a pressure conduit feeding hydraulic fluid under high pressure to a motor and an exhaust conduit exhausting the fluid from the motor. Both conduits are housed in a casing which is air cooled.

Both conduits likewise are formed in sections communicating with an interposed valve. The valve is of the diverter type which permits free, substantially straight line flow through the conduits when the motor is operated at full speed, but which diverts the flow from the upstream section of the pressure conduit to the downstream section of the exhaust conduit when the motor is stopped, it being possible to adjust the valve also to any intermediate position as required to regulate the motor speed.

The hydraulic fluid thus circulates at full speed at all times. It circulates through the motor when the motor is being driven. It bypasses the motor, circulates through the valve, and returns to its source when the motor is not in operation. Precise control of the motor thus is achieved without developing excessive heat and without subjecting the conduit system to on-off flow changes which could result in rupturing shock.

Considering the foregoing in greater detail and with particular reference to the drawings, wherein:

FIGS. 1 and 2 are views in side elevation, partly in section, of the valved hydraulic fluid conduit assembly of my invention and of the novel valve included therein; illustrating the valve in two positions of adjustment, i.e. a FIG. 1 position in which the valve is open, transmitting the hydraulic fluid in straight line flow through the valve and a FIG. 2 position wherein the valve is closed, diverting the flow of fluid so that it is recycled immediately to the pump, bypassing the motor or other appliance to be driven by the pressurized fluid.

As has been indicated above, the presently described conduit assembly is adaptable particularly for use in transmitting hydraulic fluid under high pressure to high speed rotary hydraulic motors such as are employed in driving pruning saws. Such saws are mounted on a handle which may be 12 or 15 feet long and which houses the fluid transmission lines.

Such an application is illustrated in the drawings. The assembly includes a pressure conduit formed in two axially aligned sections 10, 10a and an exhaust conduit likewise formed in two axially aligned sections 12, 12a. These are arranged substantially parallel to and, preferably, slightly spaced from each other to assist in the dissipation of developed heat.

The two conduits are housed in a casing which likewise is formed in two aligned axially aligned sections 14, 14a. The casing is spaced slightly from the conduits and provided with air vent openings 16. There thus is assured an air cooled handle which facilitates use of the appliance to which the conduits are coupled.

Suitable coupling means 18 are provided for coupling pressure conduit 10 to a pressure line 20 leading from the pumping system, as well as for coupling exhaust conduit 12 to a line 22 which returns the exhaust fluid to the pumping system. Suitable coupling means, not illustrated, also are provided for coupling the downstream ends of conduits 10a and 12a to the rotary hydraulic motor to be driven by the pressurized hydraulic fluid.

Interposed between the conduit sections and casing sections is an hydraulic valve indicated generally at 30 which has for its function starting and stopping motor 24 as well as controlling its speed during use.

Valve 30 includes a hollow valve body 32 equipped with a first threaded extension 34 threaded into the end of casing section 14. It also is provided with a diametrically opposed extension 36 which is received in one end of a coupling sleeve 38 provided with a circumferential band 40 supporting a tab 42. Sleeve 38 couples section 14a of the casing to the valve body, the end of the casing being inserted into the sleeve and secured by means of bolts, brazing or otherwise.

Extensions 34, 36 of the valve body are formed with axially aligned inlet and outlet pressure line ports 44, 46 respectively, and with axially aligned inlet and outlet exhaust line ports 48, 50 respectively.

Ports 44, 46 receive pressure conduit sections 10, 10a and are sealed with O-rings 45, 47. Ports 48, 50 receive exhaust conduit sections 12a, 12 and are sealed with O-rings 49, 51.

The valve body also is provided with diametrically opposed openings at the top and bottom. A cupped cap piece 52 having a central opening through its top is threaded into the upper opening of the valve body. It is maintained in sealed relation by O-ring 54. A plug 56 having a central opening is threaded into the bottom opening of the valve body and is maintained in sealed relation by O-ring 58.

A diverter type valve core reciprocatably is mounted in the valve body. It comprises an elongated stem 60 which slidably penetrates the aligned central openings in cap piece 52 and plug 56. It is sealed by an O-ring 62 in the cap piece and an O-ring 64 in the plug.

Fixed centrally to valve stem 60 is a spool type diverter element 66 having therethrough a diagonal passageway 68 which interconnects the hollow interior of cap piece 52 and the chamber present in the hollow valve body, serving a pressure relieving function.

Spool 66 is dimensioned and positioned so that it may be placed in registration with one or the other of the conduit section pairs, e.g. with conduit section pair 10, 10a in FIG. 1.

Means are provided for adjusting deflector element 66 between two extreme positions, as well as to all intermediate positions. In the motor-driving FIG. 1 position of the valve, deflector element 66 registers with aligned sections 10, 10a of the pressure feed line. In the motor-idling position of FIG. 2, deflector element 66 is placed in an intermediate position wherein it spans part of both sectional conduits interconnecting the same.

Various adjusting means may be employed for this purpose. In the form of the invention shown in the drawings, the adjusting means comprise lever 70 contoured and positioned to be convenient to the hand of an operator holding handle segment 14 of the case.

One end of lever 70 pivotally is attached by means of pin 72 to bracket 42. The intermediate portion of the lever is fulcrumed through connecting link 74 to an end of valve stem 60. The other end of the valve stem is retained by retainer 76 releasably secured in position by screw 78.

Resilient means are present to maintain spool 66 normally in its FIG. 2 position. Such means may comprise a compression spring 80 seated in a recess in cap piece 52 and pressing against the adjacent surface of spool 66.

From the foregoing description of the invention, it will be apparent that when valve 30 is adjusted to its FIG. 1 motor-driving position, hydraulic fluid under high pressure will flow through line 20, conduit section 10, around valve spool 66, through aligned conduit section 10a and thus to motor 24.

Hydraulic fluid exhausted from the motor will travel through conduit section 12a, through the valve body around valve stem 60, through aligned conduit section 12, out exhaust line 22 and thence to the pumping system to be recycled.

It is to be observed particularly that in this position of adjustment of the assembly, that straight line flow is achieved, thereby minimizing the development of heat, and delivering fluid at maximum pressure to motor 24.

When it is desired to arrest the operation of the motor, lever 70 is adjusted to its FIG. 2 position. This may be accomplished simply by releasing it, whereupon spring 80 advances spool 66 and lever 70 to a position determined by retainer 76 on the end of the valve stem.

In this position of the valve, hydraulic fluid circulates at high speed through the valve body, but rather than being transmitted from pressure conduit section 10 to pressure conduit section 10a, it is diverted to exhaust conduit section 12, which transmits it back to the pumping system. High speed, high pressure flow thus is maintained at all times available for instant use.

It is to be observed further that when the valve is adjusted to its FIG. 2 position and the flow of fluid under pressure to motor 24 is cut off, the momentum of the motor causes it to act as a pump, pumping hydraulic fluid through conduit sections 10a, 12a. The pressure developed by this circulation normally would require relief valves or similar contrivances to prevent the rupture of the apparatus.

However, when using the valving system of the present invention, spool 66 of the valve merely diverts the flow from exhaust conduit section 12a into pressure conduit section 10a. The fluid is permitted to cycle through this part of the system until the motor has coasted to a stop.

It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. A valved conduit assembly for supplying hydraulic fluid under pressure to an hydraulic motor, the assembly comprising
   (a) a pressure conduit formed in two axially aligned sections,
   (b) an exhaust conduit formed in two axially aligned sections arranged substantially parallel to the pressure conduit,
   (c) first coupling means for coupling one end of the pressure and exhaust conduits to a source of pressurized hydraulic fluid,
   (d) second coupling means for coupling the other end of the pressure and exhaust conduits to an hydraulic motor to be driven by the pressurized hydraulic fluid,
   (e) valve means interposed between the sections of the pressure and exhaust conduits,
   (f) the valve means comprising
      (1) a hollow valve body,
      (2) first substantially axially aligned inlet and outlet ports,
      (3) third coupling means for coupling the adjacent ends of the pressure conduit sections to the respective first inlet and outlet ports,
      (4) second substantially axially aligned inlet and outlet ports arranged substantially parallel to the first ports,
      (5) fourth coupling means for coupling the adjacent ends of the exhaust conduit sections to the respective second inlet and outlet ports,
      (6) a spool valve body traversing and communicating with the first and second ports,
      (7) a spool valve in the valve port reciprocative longitudinally therein between a fluid pressure feed position communicating the pressure feed inlet and outlet ports with each other and the exhaust inlet and outlet ports with each other and sealing the pressure feed ports from the exhaust ports, and a fluid pressure diverting position communicating all of the ports with each other,
      (8) and adjusting means engaging the spool valve for adjusting the latter between a motor-driving position in which the fluid is transmitted in substantially straight line flow through the conduit sections and valve body and a motor-idling position in which fluid is transmitted directly from the pressure conduit to the exhaust conduit, thereby bypassing the motor.

2. The assembly of claim 1 including an outer casing enclosing the conduit sections and spaced therefrom, the casing being perforated to permit the circulation of air therethrough.

3. An hydraulic valve for controlling the flow of fluid to and from an hydraulic motor, the valve comprising
   (a) a hollow valve body,
   (b) first substantially axially aligned inlet and outlet ports,
   (c) first coupling means for coupling the first inlet and outlet ports into a pressure line feeding hydraulic fluid to the motor,
   (d) second substantially axially aligned inlet and outlet ports,
   (e) second coupling means for coupling the second inlet and outlet ports into an exhaust line exhausting fluid from the motor,
   (f) fluid diverter means mounted in the valve body in the paths of travel of hydraulic fluid passing therethrough, the fluid diverter means comprising a spool dimensioned and arranged to register with one of the port pairs only in the motor-driving position and to interconnect the port pairs in the motor-idling position,
   (g) and adjusting means comprising a valve stem reciprocatively mounted in the valve body and arranged substantially normal to the planes of the axes of the port pairs and mounting the spool, and means for adjusting the valve stem between a motor-driving position in which fluid is transmitted in substantially straight line paths of flow between the respective ports, and a motor-idling position in which the fluid is transmitted in a path of flow leading directly from the pressure line inlet port to the exhaust line outlet port.

4. The hydraulic valve of claim 3 wherein the valve stem is spring-pressed, and lever means is pivotally connected to the end of the valve stem for adjusting the valve stem between motor-driving and motor-idling positions.

5. A fluid pressure control valve, comprising
   (a) a valve body,
   (b) substantially axially aligned inlet and outlet fluid pressure feed ports in the body,
   (c) substantially axially aligned inlet and outlet fluid pressure exhaust ports in the body, (d) a spool valve port in the body traversing and communicating with the feed and exhaust ports,
(e) a spool valve in the valve port reciprocative longitudinally therein between a fluid pressure feed position communicating the feed ports with each other and the exhaust ports with each other and sealing the feed ports from the exhaust ports, and a fluid pressure diverting position communicating all of the ports with each other, and
(f) adjusting means engaging the spool valve for reciprocating the latter.

6. The control valve of claim 5 including spring means operatively engaging the spool valve and urging the latter to said diverting position.

7. The control valve of claim 5 wherein the spool valve has passageway means therein communicating its opposite ends with each other in the spool valve port for equalizing the fluid pressures at said opposite ends of the spool valve.

References Cited
UNITED STATES PATENTS

| | | | |
|---|---|---|---|
| 313,393 | 3/1885 | Westinghouse | 137—375X |
| 925,692 | 6/1909 | Gold | 137—625.29 X |

M. CARY NELSON, *Primary Examiner.*

ARNOLD ROSENTHAL, *Examiner.*